Jan. 2, 1934. E. L. RASMUSSEN 1,941,718
GRASS CLIPPER
Filed Oct. 14, 1932
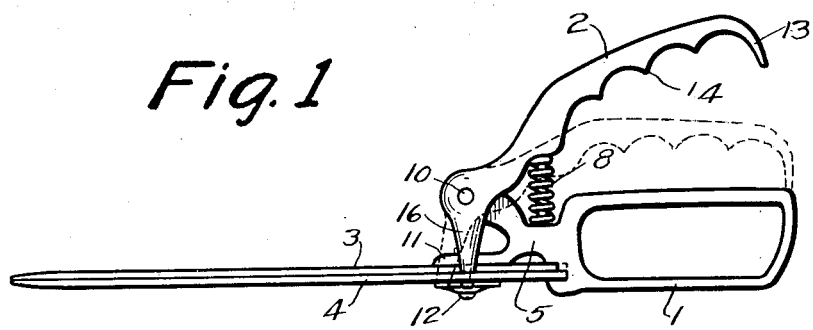
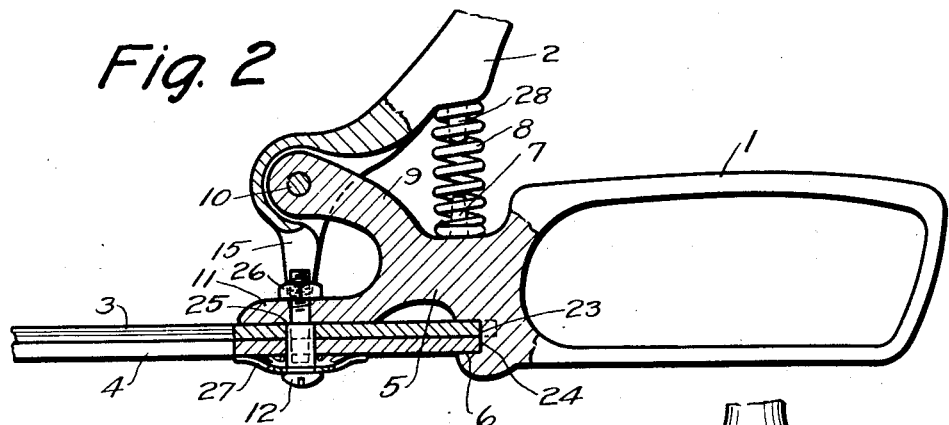
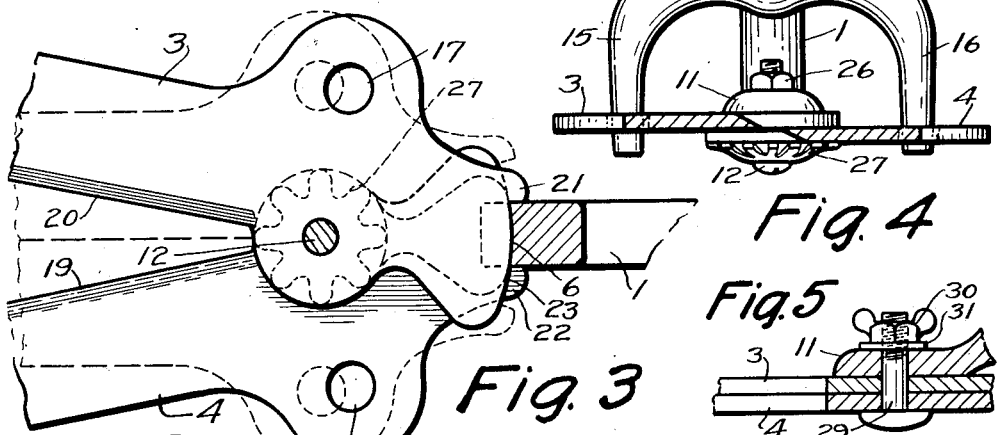
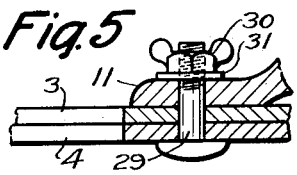
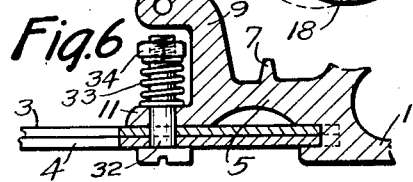
INVENTOR.
Edward L. Rasmussen
BY
James Harrison Bowen
ATTORNEY Patented Jan. 2, 1934

1,941,718

UNITED STATES PATENT OFFICE 1,941,718

GRASS CLIPPER

Edward L. Rasmussen, Seattle, Wash.

Application October 14, 1932. Serial No. 637,680

12 Claims. (Cl. 56—241)

The invention is a grass clipper which may also be used as a pruner in which the blades are pivotally mounted and operated by a direct action providing an enormous leverage and practically eliminating all hand strain.

The object of the invention is to provide a clipper for cutting grass or pruning which has considerable leverage so that it may readily cut tough grass or shrubs of considerable thickness without causing hand strain.

Another object is to provide in hand grass clipping shears means resiliently holding the cutting edges of the shears together.

Another object of the invention is to provide a grass clipper which may rest upon the ground and be operated by pressing an upwardly extending lever downward and permitting it to raise upward.

Another object of the invention is to provide hand grass clipping shears having a handle formed in a continuous loop with the lower side closed to prevent the hand rubbing on the ground and thereby forming a protection therefor.

A further object of the invention is to provide a clipper in which both of the blades are pivotally mounted and operated by a common lever providing direct action.

And a still further object of the invention is to provide hand grass clipping shears having pivotally mounted blades which are of a simple and economical construction.

With these ends in view the invention embodies a handle, blades pivotally mounted in the handle, means resiliently holding the blades, a lever hinged to the handle and adapted to operate the said blades, and a spring for raising the said lever.

Other features and advantages of the invention will appear from the following description taken in connection with the drawing, wherein:

Figure 1 is a view showing a side elevation of the clipper.

Figure 2 is a longitudinal section thru the clipper with part of the handle and blades broken away.

Figure 3 is a sectional plan showing the operation of the blades.

Figure 4 is a cross section thru the blades looking toward the handle showing the yoke by which the blades are operated.

Figure 5 is a detail showing an alternate construction in which the blades are rigidly instead of resiliently held.

Figure 6 is a similar detail showing alternate means for resiliently holding the blades.

In the drawing the clipper is shown as it would be made wherein numeral 1 indicates the handle, numeral 2 the operating lever, and numerals 3 and 4 the blades.

The handle 1 which should properly be termed the lower handle or base is of a somewhat rectangular shape with a similar shaped opening therein and at one end is a shank 5 having a recess 6 therein for holding the rear ends of the blades, in the lower portion thereof, and a lug 7 on the upper surface for holding a spring 8, and at the end thereof is an upwardly extending projection 9 to which the lever 2 is hinged by a pin 10, and a lower projection 11 to which the blades 3 and 4 are pivotally attached by a bolt 12. It will be understood, however, that the handle 1 may be of any other design or shape and arranged in any other manner to hold the different devices as described.

The operating lever 2 is hinged to the handle by the pin 10 as shown and from the hinge it extends upward, as shown in Figure 1, and the outer end is provided with a projection 13 which engages the upper surface of the handle to limit the downward movement thereof, as shown in dotted lines, to protect the fingers of a hand in which it may be held. The inner surface of the lever is formed with lugs 14 thereon to facilitate gripping so that the handle may rest upon the ground and the blades operated by gripping the lever 2. Below the pivot the lever is divided forming a yoke with two downwardly extending prongs 15 and 16 which are spaced apart so that they are positioned on each side of the device and extend thru openings 17 and 18 in the blades and which open and close the blades as the lever is operated.

The blades 3 and 4 are formed of flat pieces of material with their cutting edges 19 and 20 beveled and sharpened, and both are pivotally mounted on the bolt 12 with their inner ends slidably held in the recess 6 in the inner end of the handle 1 and their inner ends provided with lugs 21 and 22, which will engage the sides of the handle 1 and limit the outward movement of the blades. The surfaces 23 and 24 at the inner ends of the blades are curved on a radius from the center of the bolt 12 so that they will engage the inner end of the recess 6 to insure a snug fit in all positions.

The bolt 12 upon which the blades are pivotally mounted is formed with a shoulder 25 which engages the lower surface of the projection 11 and is held and locked against the projection by a nut 26 as shown in order to prevent its working loose, and under the head of the bolt is a spring washer 27 which bears against the blades and provides automatic adjustment, to hold the blades rigidly together as they wear to prevent grass or the like passing between the blades instead of being cut by them. A spring lock washer, as shown in Figure 5, may be used under the nut 26 if desired, and it will be understood that the washer 27 may also be omitted so that the bolt head 12 will bear against the lower side of the blades.

It will be noted that the blades are returned to their normal or open position by the spring 8 forcing the lever 2 upward as it is released, and the upper end of the spring is held on a lug 28 on the under side of the lever. It will be appreciated that this spring may be arranged in any other suitable manner or any other type of spring or other resilient holding means, may be used.

In the design shown in Figure 5 the bolt 12 is replaced by a plain bolt 29 which passes directly thru the blades and the projection 11 and may be rigidly held by a lock nut 30. A spring washer 31 may be used under the nut, as shown, if desired, however, this is not essential and may be omitted.

In the design shown in Figure 6 a bolt 32 is used and this extends upward above the projection 11 and a coil spring 33 is placed thereon between the upper surface of the projection 11 and a nut 34 on the bolt. This spring may be made comparatively heavy, and the tension thereof may also be adjusted by the nut 34 so that the blades may be held together with any desired force, or the force may be adjusted to compensate for the substance being cut.

It will be understood that other changes may be made in the construction without departing from the spirit of the invention. One of which changes may be in the shape, design, or arrangement of the blades, another may be in the use of other means for resiliently holding the blades, and still another may be in the design or arrangement of the operating lever.

The construction will be readily understood from the foregoing description. In use the device may be placed upon the ground and held and operated by the lever 2 as when the lever is pushed downward the blades will move from the full line to the dotted line position, as shown in Figure 3, so that the shearing edges will move together, and as the distance from the center of the pivot to the blades is short as compared with the length of the operating lever these blades will be brought together with considerable force as compared with the force required to operate the lever. The clippers may, therefore, be used to cut the toughest grass or shrubs a half of an inch in diameter with a slight pressure, thereby eliminating practically all hand strain. It will be noted that the lower bar of the handle or base 1 will protect the lower part of the hand and prevent its rubbing on the ground. It will also be noted that the tension holding the blades together may be adjusted to compensate for wear or the kind of material being cut.

Having thus fully described the invention what I claim as new and desire to secure by Letters Patent, is:

1. In a grass clipper of the character described, a handle, two blades pivotally mounted in the handle, said shearing blades having openings in the sides thereof adjacent the pivot point, an operating lever hinged to the handle having prongs extending into the openings in the blades for drawing the blades together as the lever is pushed downward, and means for resiliently raising the said operating lever.

2. A clipper comprising a handle, a pair of shearing blades both of which are pivotally mounted at a central point in the handle, and an operating lever with a yoke the ends of which are operatively associated with the outer edges of the blades hinged to the handle for operating the said blades.

3. A pair of shears comprising a handle, a pair of sharpened blades both of which are pivotally attached to the handle at a central point, and a lever also pivotally attached to the said handle and having extensions operatively associated with the outer edges of the said blades for opening and closing the blades.

4. In a pair of shears of the character described, a handle positioned to rest upon the ground, said handle having an extension at the forward end and a recess behind the said extension, blades with sharpened edges pivotally mounted upon the said extension and positioned with their inner ends held in the said recess, an operating lever also pivotally mounted upon the said handle with a yoke at the end, the ends of which extend thru openings in the plates for operating the said blades, and resilient means for moving the lever to open the blades, said lever adapted to be moved manually to close the blades.

5. In a clipper of the character described, a handle with extensions at the forward end, blades with sharpened edges pivotally mounted on one of the said extensions, means for holding the inner ends of the blades, an operating lever also pivotally mounted on one of the said extensions having a yoke thereon with the separated ends of the yoke extending thru openings in the blades for operating the said blades, and resilient means for moving the said operating lever to such a position that the blades will be open.

6. A clipper comprising two sharpened blades, a handle, means for pivotally mounting both of the blades upon the handle at a point in the inner edges of the blades, an operating lever, means for pivotally mounting the said operating lever upon the said handle, said lever having a yoke at one end with the ends thereof connecting the lever to the blades whereby the blades will close as the lever is moved downward and open as it is moved upward, resilient means for moving the lever upward and means slidably mounting the inner ends of said blades in said handle, the sides of said mounting means engaging extensions at the ends of said blades, forming a stop for the blades, and said handle having a bar positioned to ride upon the ground as the device is used to trim on the ground forming a protection for the hand.

7. In a grass clipper of the type having a handle with two cutting blades with openings therein pivotally mounted therein, a lever pivotally attached to said handle, means resiliently holding said lever in the position of holding the blades open, a yoke extending from the end of said lever having prongs extending into the openings in said blades for closing said blades as the lever is moved downward, and means resiliently operating said lever for opening and holding said blades in the open position.

8. In a grass clipper of the type having a handle with two cutting blades with openings therein pivotally mounted therein, a lever pivotally attached to said handle, means resiliently operating said lever to open the blades, a yoke having prongs extending into the openings in said blades for closing said blades as the lever is moved downward, and means frictionally holding said blades, said blades having projections at the inner ends limiting the opening movement thereof.

9. In a grass clipper of the type having a handle with two cutting blades with openings therein pivotally mounted therein, said handle having a recess in the lower part thereof in which the inner ends of the blades are slidably held, a lever pivotally attached to said handle, means resiliently holding said lever to open the blades, a yoke having prongs extending into the openings in said blades for closing said blades as the lever is moved downward, and means frictionally holding said blades, the inner end of said blades being slidable in the recess in the end of said handle providing rigid holding means.

10. In hand shears, a handle having two pivotally mounted cutting blades supported therein, said handle having a lower side forming a base, an upwardly extending lever pivotally mounted on said handle, the end of which extends downward to engage the handle to form a stop and the inner end of which forms a yoke with the ends thereof operatively associated with the outer edges of the blades for operating said blades, and a guard formed by the lower side of said handle protecting the hand as the device is moved on the ground.

11. In hand operated cutting shears, a handle, blades pivotally mounted in said handle, means frictionally holding said blades about said pivot, said blades having openings in the outer edges thereof, and radially positioned from the point at which they are pivotally mounted, and an operating lever pivotally mounted upon said handle and having extensions extending into the openings of said blades for closing said blades as the lever is moved downward, and means resiliently raising said lever.

12. In hand operated cutting shears, a handle, blades pivotally mounted in said handle, means frictionally holding said blades about said pivot, said blades having openings in the outer edges thereof, and radially positioned from the point at which they are pivotally mounted, and an operating lever pivotally mounted upon said handle having extensions extending into the openings of said blades for closing said blades as the lever is moved downward.

EDWARD L. RASMUSSEN.